United States Patent [19]

Eyster et al.

[11] Patent Number: 5,620,210
[45] Date of Patent: Apr. 15, 1997

[54] FLUID CONDUIT COUPLING

[75] Inventors: Todd A. Eyster; Albert B. Olsen, both of Littleton, Colo.

[73] Assignee: Stanley Aviation Corporation, Aurora, Colo.

[21] Appl. No.: 547,647

[22] Filed: Oct. 24, 1995

[51] Int. Cl.⁶ .............................. F16L 21/06; A41F 1/00
[52] U.S. Cl. ..................... 285/81; 285/93; 285/373; 285/921; 285/409; 439/192; 24/625
[58] Field of Search .............................. 285/93, 373, 921, 285/233, 81, 409; 24/614, 615, 616, 625; 439/100, 192

[56]  References Cited

U.S. PATENT DOCUMENTS

| | | | |
|---|---|---|---|
| 3,181,189 | 5/1965 | Leyden | 15/22 |
| 4,008,937 | 2/1977 | Filippi | 285/233 |
| 4,150,464 | 4/1979 | Tracy | 24/77 R |
| 4,346,428 | 8/1982 | Galf | 361/215 |
| 4,534,090 | 8/1985 | Skobel | 24/625 |
| 4,577,377 | 3/1986 | Kasai | 24/625 |
| 4,621,840 | 11/1986 | Foster | 285/233 |
| 4,631,787 | 12/1986 | Kasai | 24/616 |
| 4,639,982 | 2/1987 | Kasai | 24/616 |
| 4,662,040 | 5/1987 | Terrell et al. | 24/625 |
| 4,688,337 | 8/1987 | Dillner et al. | 24/616 |
| 4,699,403 | 10/1987 | Wong | 285/233 |
| 4,712,280 | 12/1987 | Fildan | 24/625 |
| 4,808,117 | 2/1989 | Galf et al. | 439/192 |
| 4,881,760 | 11/1989 | Runkles et al. | 285/93 |
| 4,900,070 | 2/1990 | Runkles et al. | 285/233 |
| 5,188,400 | 2/1993 | Riley et al. | 285/233 |

Primary Examiner—Eric K. Nicholson
Attorney, Agent, or Firm—Fields & Johnson, P.C.

[57] ABSTRACT

A coupling assembly for connecting adjacent ends of conduits, primarily used for aircraft fuel, water and oxygen lines having redundant locking features is provided. This coupling can be manipulated with one hand and includes laterally spaced locking tines which engage a mating channel for locking the coupling in secured relationship. The coupling assembly can be manipulated with one hand and has viewing ports to ensure that all parts are in place. A pivotal locking member is provided to supply additional redundancy. The locking member has at least one fin which is received between the locking tines and snaps into locking position when the coupling is securely fastened. If the coupling is not securely fastened, the fin will not fit between the tines, thereby preventing the locking member from snapping into locked position. Thus, the mechanic will know that the coupling is not securely fastened and will take steps to remedy the problem. When snapped into locked position, the pivotal locking member also serves to prevent the locking tines from accidental disengagement. The pivotal locking member provides full redundancy so that if the locking tines are damaged or broken, the pivotal locking member provides full strength in locking the coupling halves together.

7 Claims, 3 Drawing Sheets

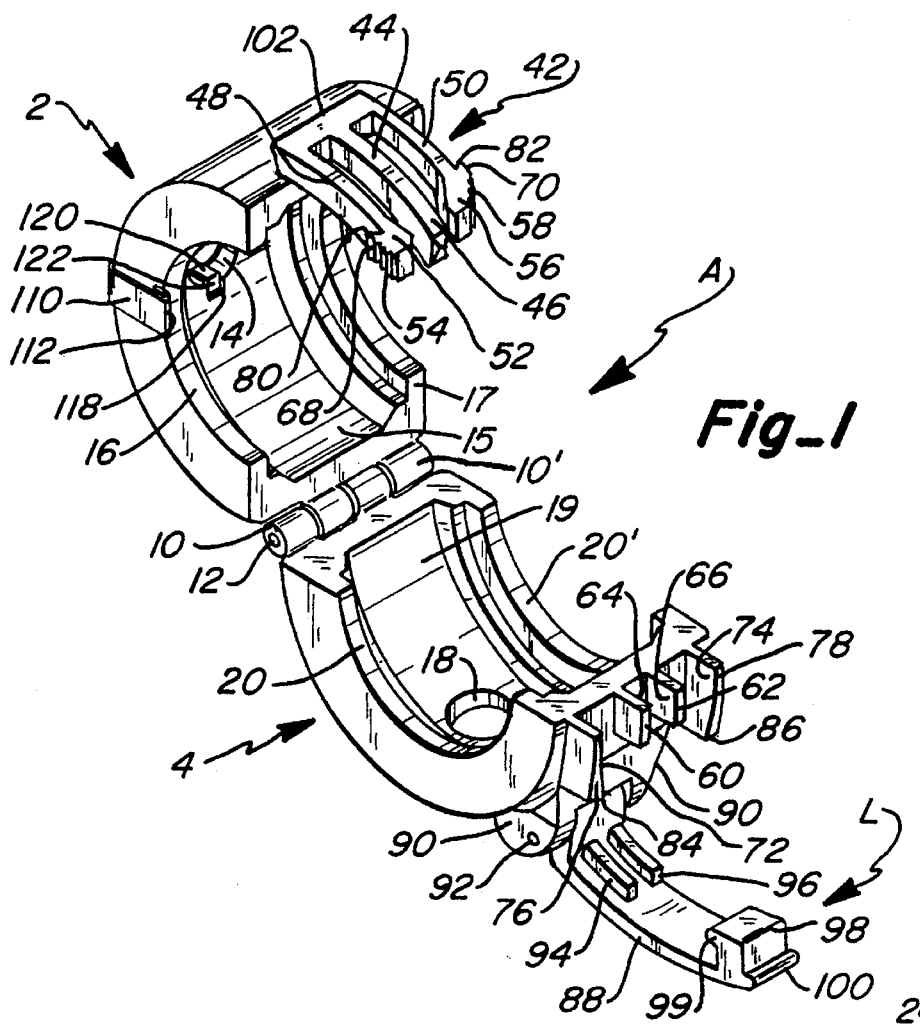
Fig_1
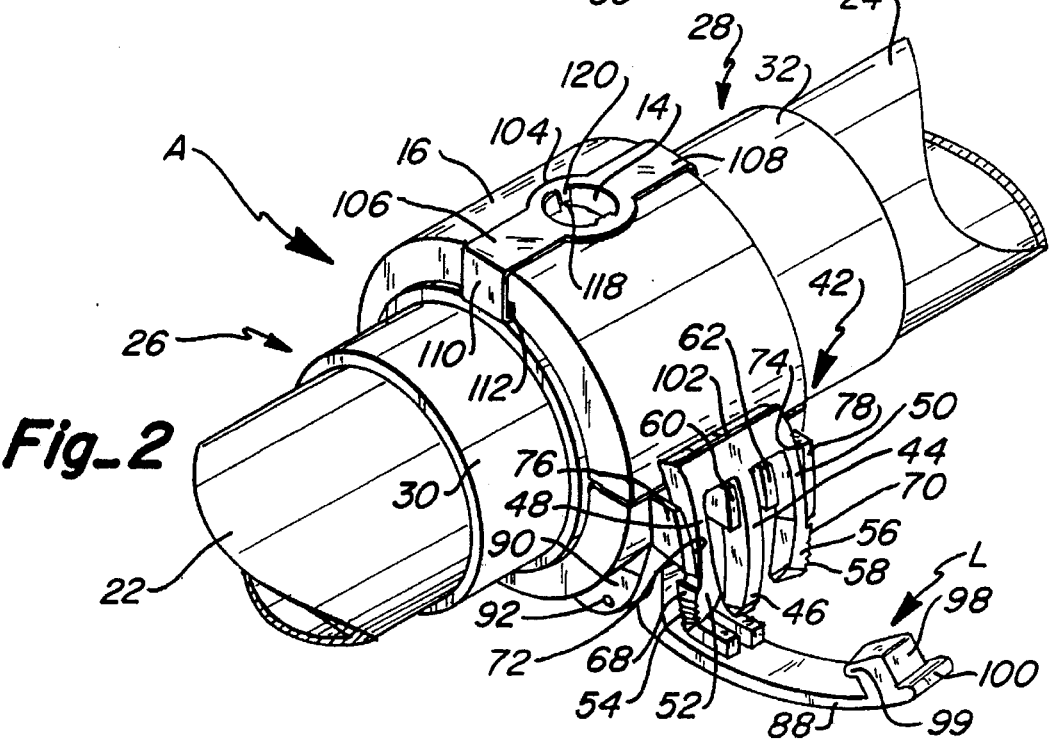
Fig_2

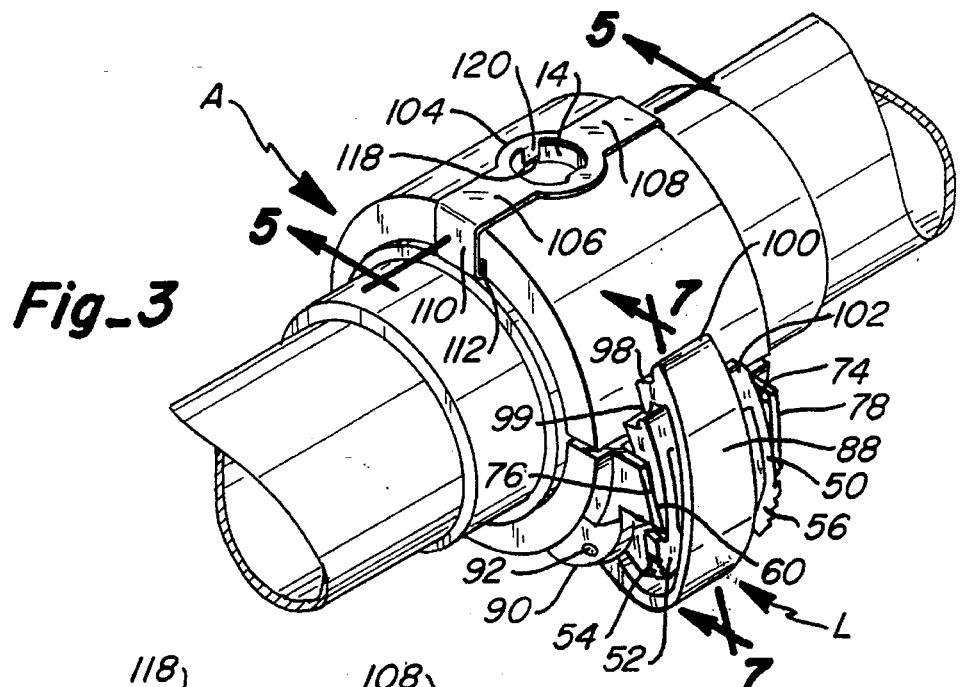
Fig_3
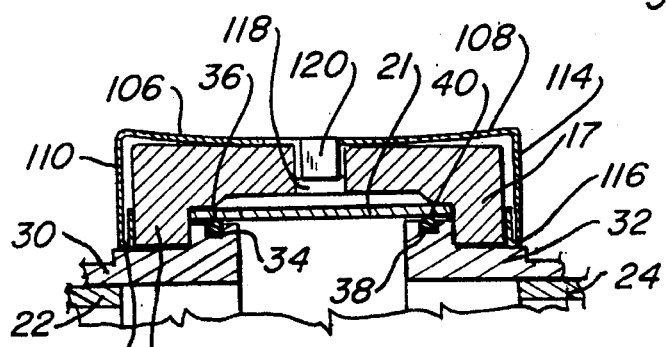
Fig_5
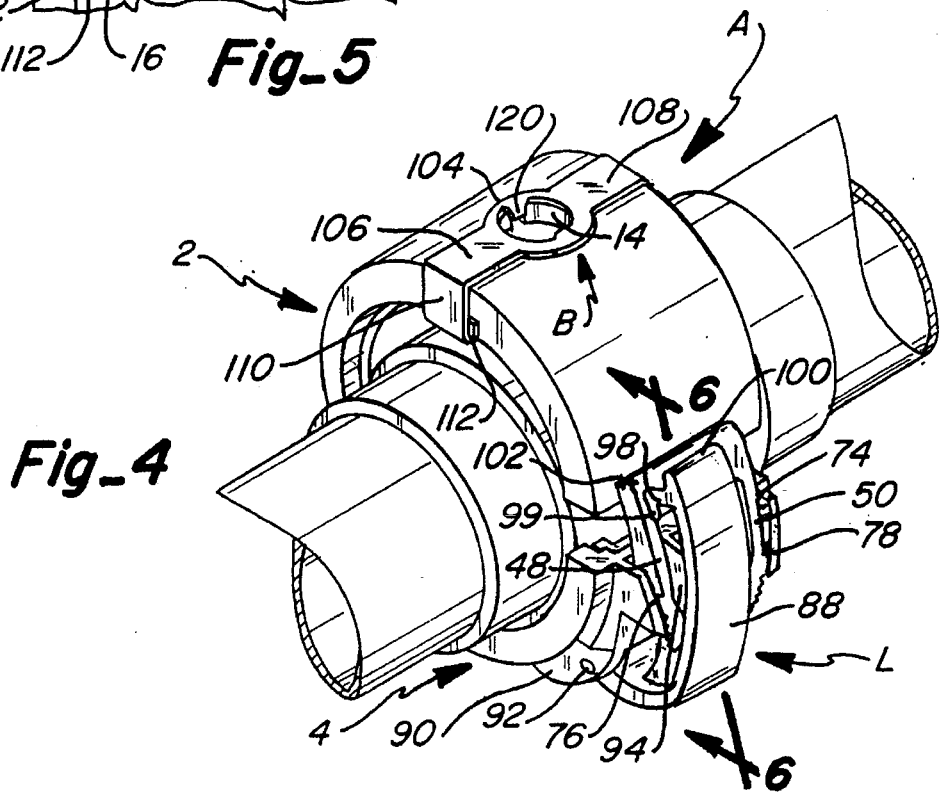
Fig_4

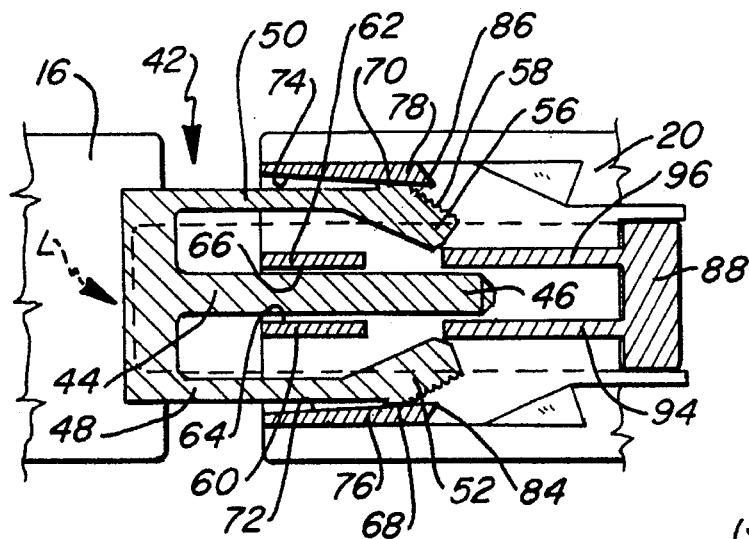
Fig_6
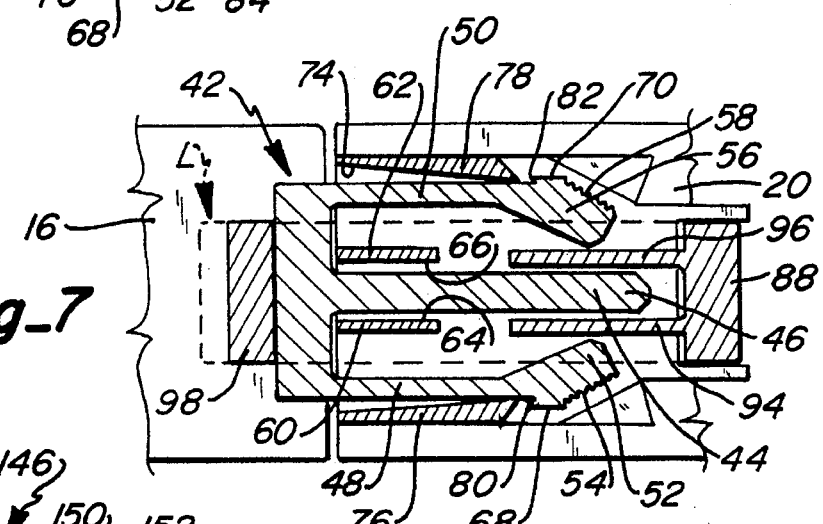
Fig_7
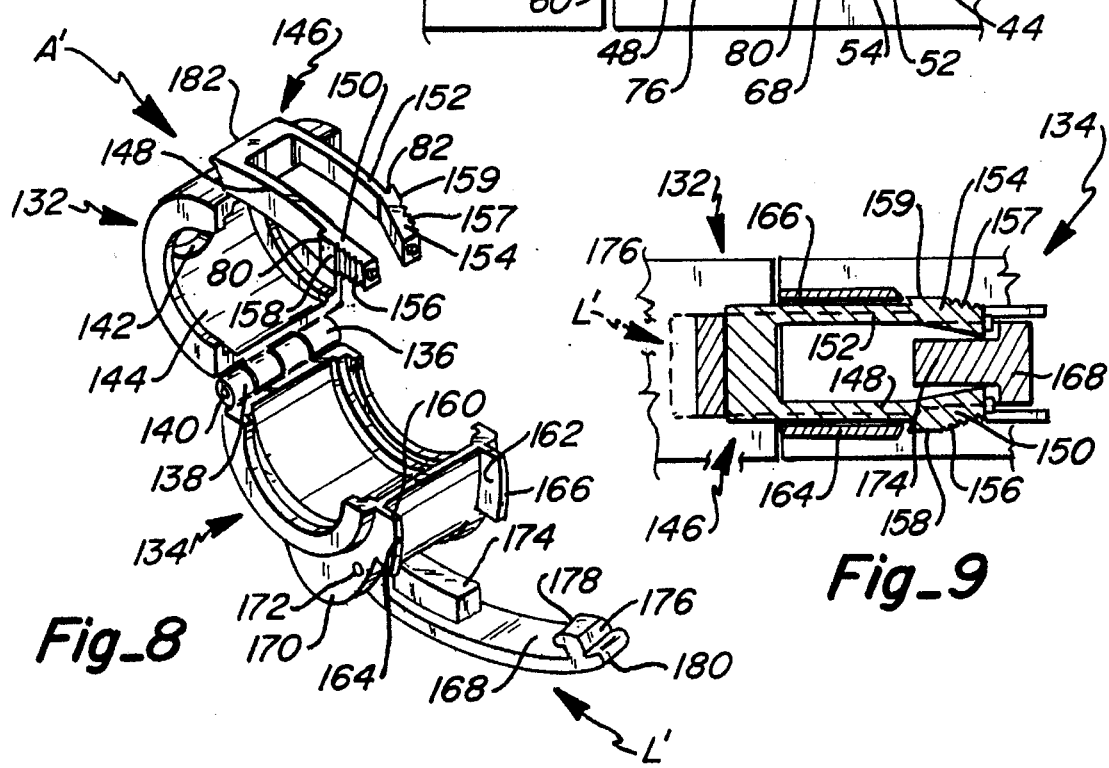
Fig_8
Fig_9

FLUID CONDUIT COUPLING

TECHNICAL FIELD

The present invention relates to a coupling assembly, and in particular to a coupling assembly for interconnecting a pair of tubular fluid carrying conduit members in which the coupling assembly has a releasable locking member with redundancy features to verify whether or not the coupling assembly is completely closed. The invention finds particular application for interconnecting fluid lines in aircraft, such as lines for conveying fuel, water and oxygen.

BACKGROUND ART

Because of the space confinements within an aircraft, coupling assemblies for interconnecting tubular conduit members are often located at places within the aircraft which are difficult to reach, to see and to service. Thus, it is desirable to have couplings which can be easily manipulated with one hand by the mechanic for closure and which can be visually and tactilly inspected easily to ensure that closure has in fact occurred. In addition, it is necessary that the fastening device used on the coupling have redundancy features to minimize inadvertent opening of the coupling should a latch become damaged.

The latching or locking art is well developed. There are many examples of latching devices having a central tine for guiding the latching mechanisms together and spaced outer tines which are resilient or bendable for moving them between latched and unlatched position for separating and connecting the latching members. Examples of these are U.S. Pat No. 3,181,189 to Leyden which shows a latching mechanism for connecting a toothbrush shank to an electric motor. U.S. Pat. No. 4,150,464 to Tracy; U.S. Pat. No. 4,631,787 and U.S. Pat. No. 4,639,982, both to Kasai; U.S. Pat. No. 4,662,040 to Terrell, et al.; and U.S. Pat. No. 4,712,280 to Fildan each show buckles for straps wherein one of the members has a central flexible tine spaced on either side of the central tine for receipt in a suitable receiving member. Although each of these devices is satisfactory for its intended purpose, none provides an arrangement wherein the tines are as readily accessible as is desirable in an aircraft configuration.

U.S. Pat. No. 4,534,090 to Skobel discloses a latching mechanism having a pair of tines with curved ends which reduces the surface in engagement with the receiving member which will lower the frictional forces on the device when it is being connected or released. However, it has none of the other features of the present invention.

U.S. Pat. No. 4,577,377 to Kasai and U.S. Pat. No. 4,688,337 to Dillner, et al., each disclose a female member having tapered side edges which engage the outer surfaces of the flexible tines. However, the geometry of the devices is not such that once they are released, they will tend to be urged apart by the reactive forces within the devices.

U.S. Pat. No. 4,881,760 to Runkles, et al., discloses a pair of arcuate coupling halves pivotally joined together at first adjacent ends. A central longitudinal channel is formed at the other end of one of the coupling halves with a pair of locking channels formed respectively on opposite sides of the central channel. A central tine is extendable longitudinally from the outer surface of the end of the other of the coupling halves and a pair of resilient locking tines extend respectively from the outer surface of the opposite end of the other coupling halves on opposite sides of the central tine. When closed, the resilient locking tines snap into engagement with the locking surfaces of the respective channels to releasably hold the coupling halves in closed position.

U.S. Pat. No. 4,900,070 to Runkles, et al., is similar to the previous patent but has rigid tines which are pivoted at one end and are moved from a predetermined position during closing against the force of a spring. While each of these inventions are suitable for their intended use, sometimes only one tine is completely locked. Since the coupling is often in a location where it cannot be easily viewed, the mechanic will hear or feel one tine snap into place and will believe that both tines are locked when, in fact, they are not. Thus, the redundancy feature is not effective.

DISCLOSURE OF THE INVENTION

In accordance with this invention a coupling assembly for releasably interconnecting first and second annular flanges on respective confronting ends of first and second fluid carrying conduit members is provided. The coupling assembly includes a pair of arcuate coupling halves pivotally joined together at first adjacent ends for circumferentially surrounding the confronting conduit ends and including an arcuate circumferential wall and a pair of spaced ribs extending inwardly from opposite circumferential edges thereof, at least one longitudinal locking channel on the outer surface of the opposite end of one of the coupling halves forming spaced, opposed inner side surfaces, and a male locking member including at least a pair of resilient locking tines extending longitudinally from the outer surface of the opposite end of the other of the coupling halves. The locking tines are bendable toward each other for reception within the locking channel, each having an end with an outer surface which make contact with each inner side surface, respectively, of the locking channels during closure and release. Each locking tine further includes a locking surface which snaps into engagement with a locking surface of the locking channel to releasably hold the coupling halves in closed position around the sleeve. The male locking member has a locking surface adjacent the opposite end of the other of the coupling halves.

Additionally, an elongated latch is provided which has a first end and a second end. The first end is pivotally connected to the opposite end of the one of the coupling halves and is extendable across the locking tines for engagement with the locking edge when the coupling halves are in closed position. At least one fin extends from an inner surface of the elongated latch and is positioned between the tines when the coupling halves are in the closed position to prevent bending of the locking tines toward each other. A locking catch is at the second end of the elongated latch for locking engagement with the locking edge on the male locking member when the coupling halves are in closed position to hold at least one fin between the locking tines. If the tines are not properly locked in place, the fin will not fit between them. This will prevent the locking catch from closing, thereby telling the mechanic that the coupling is not secure. Furthermore, once the locking catch is in closed position, it prevents the tines from becoming disengaged and provides complete redundancy should the tines fail. In other words, the locking catch will hold the coupling halves in closed position even if the tines are not functional.

Furthermore, a sight opening extends through the arcuate circumferential wall of one of the pair of arcuate coupling halves from the outside to the inside. The sight opening has a pair of grooves or recesses formed opposite each other adjacent the inside thereof. A bonding jumper has an annular section positionable on the outer side of the circumferential wall having an outer edge and an inner edge. The inner edge has a diameter substantially identical to that of the sight opening and has a pair of center legs oppositely located on and depending from the inner edge. The center legs have out-turned feet respectively engageable with the pair of grooves or recesses. The bonding jumper further has an oppositely extending pair of arms, each of the arms having a depending end engageable respectively with the first and second fluid carrying conduit members.

Additional advantages of this invention will become apparent from the description which follows, taken in conjunction with the accompanying drawings.

BRIEF DESCRIPTION OF THE DRAWINGS

FIG. 1 is a perspective view of one form of the coupling assembly of this invention in open position;

FIG. 2 is a fragmentary perspective view showing the coupling assembly connecting confronting conduit ends with the latch member in the uncoupled position;

FIG. 3 is a fragmentary perspective view, similar to FIG. 2, showing the coupling assembly connecting confronting conduit ends, but with the latch member in locked position;

FIG. 4 is a fragmentary perspective view, similar to FIGS. 2 and 3, showing the coupling assembly connecting confronting conduit ends but wherein the locking tines are not completely engaged, thereby preventing the latch member from seating into its locked position;

FIG. 5 is an enlarged horizontal section, taken along line 5—5 of FIG. 3, showing details of a bonding jumper connected to a sight opening in the coupling;

FIG. 6 is an enlarged section, taken along line 6—6 of FIG. 4, illustrating how the latch member is blocked from seating into locked position when the locking tines are not completely engaged;

FIG. 7 is a section, similar to FIG. 6, but showing the locking tines properly engaged and the locking member fully seated;

FIG. 8 is a perspective view of an alternative embodiment of the invention; and

FIG. 9 is a section showing the locking tines of the embodiment of FIG. 8 properly engaged and the locking member fully seated.

BEST MODE FOR CARRYING OUT THE INVENTION

In accordance with one form of this invention, a coupling assembly A is provided which comprises a first arcuate coupling half 2 and a second arcuate coupling half 4 having hinges 10 and 10', respectively, joined together by a pivot pin 12. Conveniently, a sight opening 14 is provided in arcuate wall 15 of coupling half 2. Arcuate wall 15 has inturned ribs 16 and 17 along opposite edges, respectively. Similarly, a sight opening 18 is provided in arcuate wall 19 of coupling half 4. Arcuate wall 19 has inturned ribs 20 and 20' along opposite edges, respectively. These sight openings allow one to inspect whether coupling sleeve 21 (shown in FIG. 5) is in place.

Referring to FIG. 2, the coupling assembly A interconnects a pair of fluid carrying tubes or conduits 22 and 24. Sealing flanges 26 and 28 are connected to conduits 22 and 24 by means of skirts 30 and 32 respectively. As best seen in FIG. 5, sealing flange 26 is provided with a recess 34 for receiving a sealing ring 36 which bears against coupling sleeve 21 to form a seal. Similarly, sealing flange 30 is provided with a recess 38 for receiving a sealing ring 40 which bears against coupling sleeve 21.

The ends of coupling halves 2 and 4 opposite the hinge have cooperating latch means. The latch means for coupling half 2 includes a male locking member 42 having a central tine 44 with a tapered distal end 46 and laterally spaced locking tines 48 and 50 on opposite sides thereof. These locking tines are identical but reversed in shape and have a narrow arm which extends parallel to but spaced from central tine 44 and is formed integrally with coupling half 2. Locking tine 48 has an enlarged head or distal end 52. The end has a tapered serrated edge 54 for pressing the tine inwardly toward central tine 44 for releasing the latch mechanism, as will be described more fully below. The opposite locking tine 50 includes an enlarged distal end 56 having a tapered serrated edge 58, also to assist in releasing the locking means.

The end of coupling half 4 opposite the hinge has a pair of spaced raised elements 60 and 62 to form a guide or channel for receiving central tine 44. Conveniently, these have internal guide surfaces 64 and 66, respectively, for receiving the tapered end 46 of tine 44 for guiding it into the channel formed between raised elements 60 and 62.

As the locking mechanism is closed, outer surfaces 68 and 70 of tines 48 and 50, respectively, will engage inwardly canted or tapered cam surfaces 72 and 74 of raised guide members 76 and 78, respectively. The relationship between these surfaces is best illustrated in FIGS. 6 and 7. As the locking mechanism continues to be closed, the locking tines 48 and 50 will be bent inwardly as surface 68 slides past surface 72 and surface 70 slides past surface 74. When the locking tines reach the position shown in FIG. 7, they spring outwardly due to their natural resilience. As the locking tines spring outwardly, locking lips 80 and 82 respectively, each lock behind a locking edge 84 and 86 on the ends of guide members 76 and 78, respectively.

To release the coupling, the mechanic merely needs to squeeze in on the serrated tapered edges 54 and 58 of locking tines 48 and 50, respectively, which will provide both an inward and longitudinal force. The possibility of the tines breaking is greatly minimized by the enlarged ends thereof which will engage central tine 44 just beyond the point of release of the locking edges.

The redundancy of the coupling assembly A as just described is readily apparent. However, the present invention provides additional redundancy. A secondary latch L is provided which has an elongated arcuate body 88 having a first end pivotally attached between a pair of ears 90, as by a pivot pin 92. A pair of laterally spaced parallel fins 94 and 96 extend outwardly from the inner side of body 88. A locking catch 98, having a locking lip 99, is provided adjacent the second end of body 88 and a finger hold 100 is provided at the second end of body 88.

After the coupling assembly A is placed around the conduits as previously described and after the locking tines have been engaged to secure the coupling to the conduits, secondary latch L is rotated toward the locking tines about pivot pin 92 until locking lip 99 of locking catch 98 engages and locks behind protrusion 102. The body 88 of the secondary latch L is curved and somewhat flexible, so that when pressure is applied near the center of body 88 causing the locking catch to be pushed against protrusion 102, the latch L straightens and elongates to allow the locking lip 99 to slide over the protrusion 102. This arrangement provides a tactile snap action so that the mechanic knows when engagement of the secondary latch L has been accomplished. If the locking tines are in fully engaged position, the fins 94 and 96 will fit within the spaces between the end 46 of central tine 44 and the end 52 of outer tine 48 and between end 46 of central tine 44 and the end 56 of outer tine 50, respectively. This locked position is clearly illustrated in FIG. 7. On the other hand, if the tines are not securely locked, as shown in FIG. 7, the fins 94 and 96 will strike the tine ends 52 and 56 to prevent latch L from closing. This will make the mechanic aware of the fact that the locking tines are not in locked position. Thus, in addition to assuring that the primary locking tines 48 and 50 are fully engaged, the secondary latch L provides two additional and important functions: (1) when engaged, the secondary latch prevents the primary locking tines 48 and 50 from disengaging and, (2) the secondary latch provides full redundancy of the locking function in case the guide members 76 and 78 or the locking tines 48 and 50 have failed.

A bonding jumper B provides an electrical connection between skirts 30 and 32 and may be made of a metal stamping. Conveniently, the bonding jumper B has a central annular element 104 with oppositely extending arms 106 and 108. Arm 106 has a depending leg 110 with an upturned end 112 which engages skirt 30. Similarly, arm 108 has a depending leg 114 with an unturned end 116 which engages skirt 32. As best seen in FIGS. 1 and 5, sight opening 14 includes a pair of recesses or grooves 118 which are located on opposite sides of the sight opening. Annular element 104 has a pair of opposed depending prongs, such as prong 120, with an inturned lip 122 that engages a groove 118.

The bonding jumper is attached to coupler half 2 by tilting it so that one of its prongs 120 is placed inside of sight opening 14 with lip 122 engaging one of the grooves 118. The other prong 120 is deflected inwardly with a tool until its lip 122 fits within sight opening 14. By pressing downwardly on annular element 104, the other prong can snap into place on the other groove 118. The width of the lips 122 and the grooves 118 are tight so that the bonding jumper B is prevented from rotating relative to coupler half 2. Also, there is an interference fit between the length of the prongs 120 and the depth of grooves 118 so that the annular element 104 of bonding jumper B is deflected radially inward and acts as a spring to hold the bonding jumper down tightly against coupler half 2. Conveniently, the opening in annular element 104 provides visual access through sight opening 14 to the inside of coupler half 2.

An alternative coupling assembly A' is shown in FIGS. 8 and 9, which has particular application for very small conduits. Coupling half 132 is pivotally connected to coupling half 134 by means of interlocking hinges 136 and 138, respectively, and pivot pin 140. Conveniently, coupling half 132 has a sight opening 142 in arcuate wall 144 for viewing the interior of the coupling assembly.

Because of the small size of coupling assembly A', coupling half 132 has a male locking member 146 with only two laterally spaced tines, namely, tine 148 with an enlarged end 150 and tine 152 with enlarged end 154. Conveniently, end 150 has a serrated edge 156 and end 154 has a serrated edge 157 which provide a gripping surface for the mechanic to squeeze inwardly on the tines to release them. The tines also have surfaces 158 and 159, which respectively engage guide surfaces 160 and 162 of spaced parallel raised elements 164 and 166. Since the tines are resilient, they can be deflected inwardly to allow surfaces 158 and 159 of ends 150 and 154 to slide along guide surfaces 160 and 162, respectively, and into the locked position shown in FIG. 9.

A secondary locking member L' has an elongated body 168 whose first end is received between a pair of ears, such as ear 170, for pivotal movement by a pivot pin 172. Adjacent the first end of body 168 on an inner surface thereof is a relatively thick fin 174. At the opposite end of body 168 is a locking catch 176 having a locking lip 178 and a finger hold 180 for manipulating the locking member L'. Thus, when the male locking member is in closed position, as shown in FIG. 9, the secondary locking member L' can be swung into a closed latched position so that fin 174 is positioned between ends 150 and 154. As secondary locking member L' is closed, locking lip 178 will snap over protrusion 182 and cause a tactile snapping action so that the mechanic will know that the coupling has been securely closed. However, if coupling assembly A' is not completely closed, the male locking member 146 will not snap into the locked position shown in FIG. 9. Rather, the tines 148 and 152 will be deflected inwardly by guide surfaces 160 and 162 of raised elements 164 and 166, respectively, so that tine ends 150 and 154 are close together, thereby preventing fin 174 from entering the small space there between. Since this will prevent secondary locking member L' from closing, the mechanic will be apprised of the fact that the coupling assembly A' has not closed properly.

From the foregoing, the advantages of this invention should be readily apparent. A coupling assembly has been provided which includes a secondary latch to provide additional redundancy. In particular, if the locking tines are not securely locked in place, the fin thereon will not fit between the ends of the tines. On the other hand, when the tines are properly locked in place, the fin will fit between the ends of the locking tines allowing the latch to snap into locked position. Additionally, when engaged, the secondary latch prevents the primary locking tines from disengaging and provides full redundancy of the locking function in case the guide members or the locking tines fail.

This invention has been described in detail with reference to particular embodiments thereof, but it will be understood that various other modifications can be effected within the spirit and scope of this invention.

What is claimed:

1. In a coupling assembly for releasably interconnecting first and second annular flanges on respective confronting ends of first and second fluid carrying conduit members, wherein said coupling assembly includes a pair of arcuate coupling halves pivotally joined together at first adjacent ends for circumferentially surrounding said confronting ends and including an arcuate circumferential wall having a thickness and a pair of spaced ribs extending inwardly from opposite circumferential edges thereof, at least one longitudinal locking channel on the outer surface of the opposite end of one of said coupling halves, and a pair of resilient locking tines extending longitudinally from the outer surface of the opposite end of the other of coupling halves, said locking tines being bendable toward each other for reception within said locking channel and each having an outer edge with a radius so that each inner side of said locking channel makes contact with each of said outer edges of said respective locking tines during closure and release and each further including a locking surface which snaps into engagement with the locking surfaces of said locking channel to releasably hold said coupling halves in closed position around said sleeve, the improvement comprising:

said locking tines having a locking edge adjacent said opposite end of said other of said coupling halves;

an elongated latch having a first end and a second end, said first end being pivotally connected to said opposite end of said one of said coupling halves and extendable across said locking tines for engagement with said locking edge when said coupling halves are in closed position;

at least one fin extending from said elongated latch and positioned between said tines when said coupling halves are in said closed position to prevent movement of said locking tines toward each other; and a locking catch at said second end of said elongated latch for locking engagement with said locking edge when said coupling halves are in closed position to hold said at least one fin between said locking tines.

2. The apparatus as claimed in claim 1, further including:

at least three longitudinal locking channels on said outer surface of said opposite end of said coupling halves;

at least three locking tines, one of said flocking tines being received in each of said locking channels; and a pair of fins extending from said elongated latch and positioned between adjacent pairs of said tines when said coupling halves are in said closed position to prevent bending of said locking tines toward each other.

3. The apparatus as claimed in claim 1, further including:

a finger-hold formed at said second end of said elongated locking catch for selectively releasing said elongated locking catch.

4. The apparatus as claimed in claim 1, wherein:

said elongated latch is arcuate and flexible so that when pressure is applied to the latch it is straightened to allow said locking catch to move into locking engagement with said locking edge.

5. The apparatus as claimed in claim 1, further including:

a sight opening extending through said arcuate circumferential wall of one of said pair of arcuate coupling halves from the outside to the inside, said sight opening having a pair of recesses formed opposite each other adjacent the inside thereof;

a bonding jumper having an annular section positionable on said outer side of said circumferential wall having an outer edge and an inner edge, said inner edge having a diameter substantially identical to that of said sight opening, a pair of center legs oppositely located on and depending from said inner edge, said center legs having out-turned feet respectively engageable with said pair of recesses, said bonding jumper further having an oppositely extending pair of arms, each said arm having a depending end engageable respectively with said first and second annular flanges.

6. In a coupling assembly for releasably interconnecting first and second flanges on respective confronting ends of first and second fluid carrying conduit members, wherein said coupling assembly includes a pair of arcuate coupling halves pivotally joined together at first adjacent ends for circumferentially surrounding said confronting ends and including an arcuate circumferential wall having a thickness and a pair of spaced ribs extending inwardly from opposite circumferential edges thereof, at least one longitudinal locking channel on the outer surface of the opposite end of one of said coupling halves, and a pair of resilient locking tines extending longitudinally from the outer surface of the opposite end of the other of coupling halves, said locking tines being bendable toward each other for reception within said locking channel and each having an outer edge with a radius so that each inner side of said locking channel makes contact with each of said outer edges of said respective locking tines during closure and release and each further including a locking surface which snaps into engagement with the locking surfaces of said locking channel to releasably hold said coupling halves in closed position around said sleeve, the improvement comprising:

a sight opening extending through said arcuate circumferential wall of one of said pair of arcuate coupling halves from the outside to the inside, said sight opening having a pair of recesses formed opposite each other adjacent the inside thereof;

a bonding jumper having an annular section positionable on said outer side of said circumferential wall having an outer edge and an inner edge, said inner edge having a diameter substantially identical to that of said sight opening, a pair of center legs oppositely located on and depending from said inner edge, said center legs having out-turned feet respectively engageable with said pair of recesses, said bonding jumper further having an oppositely extending pair of arms, each said arm having a depending end engageable respectively with said first and second annular flanges.

7. The apparatus as claimed in claim 6, wherein:

said bonding jumper is resilient and the length of said legs relative to the thickness of said circumferential wall is such that said annular section is deflected toward said sight opening to form a tight friction fit.

* * * * *